United States Patent

Ito

[11] 4,291,786
[45] Sep. 29, 1981

[54] BALANCING PIECE FOR VENTILATED BRAKE DISCS

[75] Inventor: Sadayoshi Ito, Toyota, Japan

[73] Assignee: Toyota Jidosha Kogyo Kabushiki Kaisha, Aichi, Japan

[21] Appl. No.: 88,066

[22] Filed: Oct. 24, 1979

[30] Foreign Application Priority Data

Jun. 9, 1979 [JP] Japan .............................. 54-78843[U]

[51] Int. Cl.³ .............................................. F16D 65/10
[52] U.S. Cl. ............................. 188/218 A; 74/573 R; 74/574; 188/264 A; 192/30 V
[58] Field of Search ........ 188/218 XL, 218 A, 264 A, 188/264 AA, 73.1, 18 A, 1 B, 73.5, 73.2; 192/107 R, 30 V; 74/573 R, 574

[56] References Cited
U.S. PATENT DOCUMENTS 3,366,202 1/1968 James .............................. 188/218 A
3,368,654 2/1968 Wegh et al. ..................... 188/218 A Primary Examiner—Douglas C. Butler
Attorney, Agent, or Firm—Browdy & Neimark

[57] ABSTRACT

A balancing piece fixedly received within a tapered opening of cooling vents radially disposed in a ventilated brake disc for the purpose of improving rotational balance of the ventilated disc. The balancing piece includes, as integral parts thereof, a wide portion at a wide end thereof, at least one tab portion formed adjacent to the wide portion and protruding at an acute angle relative to the wide end portion, and a locking portion at a narrow end thereof. The balancing piece is fixedly positioned within the vent, with edges of the wide portion being in contact with rounded portions of the vent, top edge of the tab portion being forcibly in abutment with an interior wall of the vent, and the locking portion being in engagement with an edge of the interior wall at an open end of the vent on the disc center side, whereby the balancing piece is completely restrained from moving out of position in any directions either radially along the length of the vent or across and/or along the width of the vent, and consequently from generating otherwise possible rattling noises.

5 Claims, 9 Drawing Figures

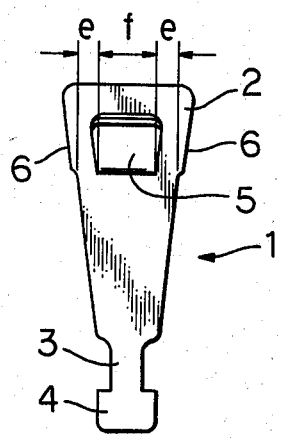
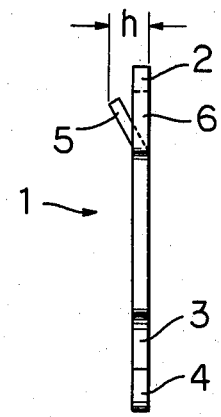
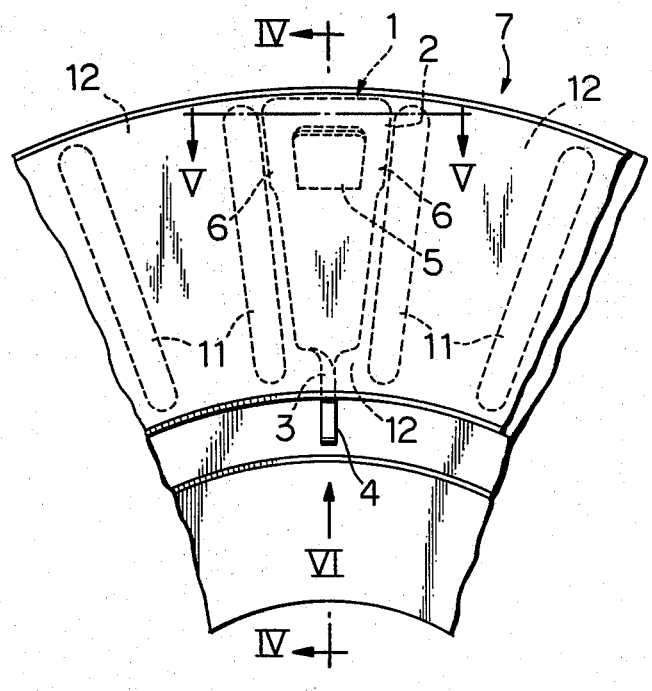

BALANCING PIECE FOR VENTILATED BRAKE DISCS

BACKGROUND OF THE INVENTION

The present invention relates to a balancing piece for ventilated-disc brakes, which is fixedly received within a cooling vent formed in a ventilated disc so as to improve rotational balance of the disc.

In general, a ventilated brake disc presently in wide use includes in a radially outward portion thereof a number of cooling vents which are disposed in the almost radial direction between the two rubbing or friction surfaces. As the disc is rotated, air is caused to flows through the vents thereby increasing heat radiating capability of the disc. Ventilated discs of such type, however, tend to lose their rotational or dynamic balance because of the provision of the multitude of cooling vents. In view of the need to improve the dynamic balance, such type of ventilated discs have conventionally employed a balancing piece which is fixedly positioned within the vent.

Among the presently available balancing pieces for use on those ventilated discs, the one disclosed in the Japanese "Jitsukousho," No. 53-33104 has been found highly excellent in terms of ease of installation thereof within the vent and locking ability to restrain itself from moving out of engagement with the vent. This balancing piece includes a wide portion which snugly fits a radially outward portion of a vent with the edges thereof being in contact with diagonally opposed corners of the vent. The balancing piece also includes a head portion which, during installation of the balancing piece, is projected through an open end of the vent on the disc center side and twisted to put its tapered edges into engagement with edges of internal wall surfaces at the above inner open end of the vent, thereby preventing the balancing piece from moving out of position toward the outer edge of the disc. Additionally, since the radially disposed vent is commonly formed so that its crosssectional area is increasing toward the outer edge of the disc, the wide portion snugly fitting the radially outward portion of the vent is restrained from moving inwardly toward the center of the disc. Thus, the balancing piece is securely fixed in position within the vent without any subsequent outward or inward movement off its fixed position.

As previously described, the balancing piece disclosed in the Japanese "Jitsukousho," No. 53-33104 would be highly praised in its excellence if its intended installation theory could be completely put to work. Actually, however, it has been conventionally found difficult to put the theory into practice. Thus, the balancing piece has offered a disadvantageous tendency of becoming loosened within the vent due to insufficient self-fastening condition and thus suffered undesired rattling noises. In concrete terms, the wide portion which fits a tapered opening of the vent, is liable to shift outwardly out of position toward the outer edge of the disc when the head portion is twisted into engagement with the inner open end of the vent, and as a result, there may develop a gap between the edges of the wide portion and the interior walls of the vent which may cause the rattling problem. In addition, dimensional errors of the vent may also result in a loose fit of the wide portion in the vent after the tapered edges of the head portion are put into engagement with the inner open end of the vent on the disc center side. This may compound the rattling problem of the balancing piece.

SUMMARY OF THE INVENTION

It is accordingly an object of the present invention to provide a balancing piece which allows easy installation within and secure fastening to a receiving vent, and eliminates chances of rattling noise generation, capable of solving the above described disadvantages inherent to the balancing piece disclosed in the Japanese "Jitsukousho," No. 53-33104.

The balancing piece in accordance with this invention is fixedly received within a radially disposed vent formed in a brake disc, the vent having a width continuously increasing toward an outer edge of the disc and being formed with rounded portions at both ends thereof as viewed across the width. The balancing piece includes as integral parts thereof: a wide portion whose both edges are put into contact with the rounded portions of the vent when the balancing piece is inserted in parallel to the width of the vent from the outer edge of the disc to a predetermined position; at least one tab portion formed near the wide portion and protruding at an acute angle relative to a surface of a wide end portion of the balancing piece, the top edge of the tab portion being forcibly in abutment with an interior wall of the vent and thus preventing the wide portion from moving away from the rounded portions of the vent; and a locking portion which is projected through an open end of the vent on the disc center side when the balancing piece is inserted to the predetermined depth, and put into engagement with the inner open end of the vent to restrain the balancing piece from moving radially toward the outer edge of the disc.

This and other objects and advantages of the invention will become apparent to those skilled in the art from the following detailed description when read in conjunction with the attached claims and accompanying drawings.

BRIEF DESCRIPTION OF THE DRAWINGS

In the drawings:

FIG. 1 is an elevational view of a preferred embodiment of the balancing piece of this invention;

FIG. 2 is a side elevational view of the same preferred embodiment;

FIG. 3 to FIG. 6, inclusive, are views of the balancing piece shown in FIGS. 1 and 2 and of a portion of a brake disc, showing a form of installation of the former within the latter, and more particularly;

FIG. 3 is a fragmentary front elevation of the brake disc incorporating the balancing piece;

FIG. 4 is a cross sectional view taken along the line IV—IV of FIG. 3;

FIG. 5 is a cross sectional view taken along the line V—V of FIG. 3;

FIG. 6 is a view taken in the direction of the arrow VI in FIG. 3;

DETAILED DESCRIPTION OF THE PREFERRED EMBODIMENT

Figure 4:
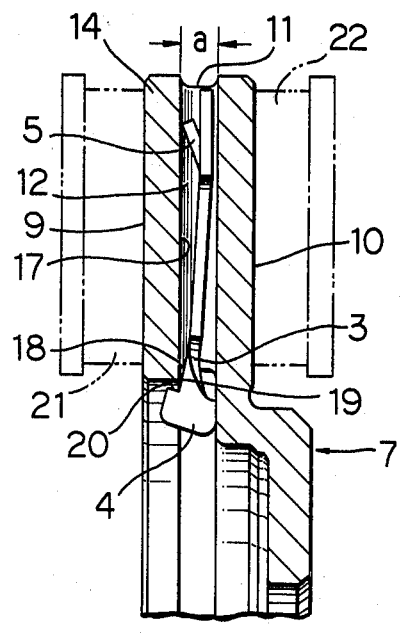
Figure 5:
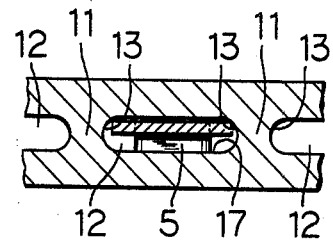
Figure 6:
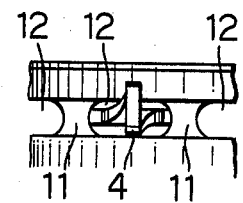

Referring now more particularly to the accompanying drawings illustrating a preferred embodiment of the present invention, there is disclosed in FIGS. 1 and 2 a balancing piece 1 before it is installed. The balancing piece 1 is a plate of tapered configuration as a whole, the width increasing from its one end toward the other, including a wide portion 2 at its wide end portion, a neck portion 3 of a purposely reduced width near the narrow end, and a head portion 4 at the narrow end which is comparatively wider than the neck portion 3. An almost rectangular section near the wide portion 2 of the balancing piece 1 is cut along its three sides to the letter "U" shape to provide a tab portion 5 which protrudes obliquely at an acute angle relative to a surface of the wide portion 2. The width "f" at the root of the tab portion 5 is so determined as to be greater than the value "2e", i.e., the sum of two equal distances between outer and inner edges of a frame portion 6 as measured along the root of the tab portion 5, for the purpose of attaining the effect clarified later in this description.

In FIG. 3 through FIG. 6 is shown a form of installation of the balancing piece 1 within a brake disc 7. The brake disc 7 includes therein a number of cooling vents 12 which are separated from each other by ribs 11 radially disposed between two rubbing or friction surfaces thereof against which brake pads 21 and 22 indicated by two-dot chain lines in FIG. 4 are forced upon application of brakes. Each of the vents 12 is a tapered opening of a substantially rectangular cross section whose width is decreasing from the outer edge toward the center of the disc 7. As is most clearly seen in FIG. 5, the vent 12 is formed with rounded portions 13 at both ends thereof as viewed across the width.

Figure 7:
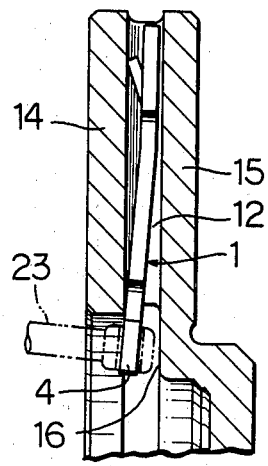
FIG. 7 is a sectional view, similar to FIG. 3, of the embodiment, illustrating the balancing piece as it appears during installation thereof in the disc.

In installation, the balancing piece 1 is inserted through an open end of the vent 12 at the outer edge of the disc 7 with the head portion 4 leading the way toward the center of the disc. It is apparent from FIGS. 3 and 5 that the width of the wide portion 2 is so selected as to be slightly smaller than that of the vent 12 when the balancing piece 1 is positioned at a predetermined depth (for example, at a depth where the edge of the trailing wide end is radially level with the outer edge of the ribs 11 as shown in FIG. 4). Additionally, the height "h" of the tab portion 5 from the backside surface of the balancing piece 1 is designed to be greater than the thickness "a" of the vent 12 whereby the top edge of the tab portion 5 is forced against a wall 14 of the vent 12 when the balancing piece 1 is inserted into the vent. This indicates the need of driving the balancing piece 1 to insert it into the vent 12. The previously described fact that the width "f" of the tab portion 5 at the root thereof is greater than the value "2e" or the sum of the two equal distances between the outer and inner edges of the frame portion 6 as measured along the root of the tab portion 5, causes mainly the frame portion 6 to bend at its root when the balancing piece 1 is driven into the vent 12. Consequently, as shown in FIG. 7, the head portion 4 is floated away from an extension 16 of a wall 15 of the vent 12, thereby making it easy to put a twisting tool 23 into engagement with the head portion 4.

Since the frame portion 6 is bent in the form of elastic as well as plastic deformation as the balancing piece 1 is driven into the vent 12, it naturally exerts an elastic restoring force onto an internal surface 17 of the vent 12 through the tab portion 5 whereby the tab portion 5 is intensely depressed at its sharp edge against the internal surface 17 having a considerable degree of roughness. Thus, once the balancing piece 1 is driven to the predetermined depth, the "edge" effect is produced, which prevents the balancing piece 1 from easily shifting outwardly out of position toward the outer edge of the disc even when the neck portion 3 is twisted with the tool 23 engaging the head portion 4.

As the neck portion 3 is twisted, one side of the head portion 4 is brought into abutment with the extension 16 of the wall 15 and therefore the neck portion 3 is caused to bend away from the extension 16. Such deformation of the neck portion 3 by combined twisting and bending forces will create an oblique portion 18 shown in FIG. 4, which engages an edge 19 of the internal surface 17 at the inner open end of the vent 12 on the disc center side, thus restraining the balancing piece 1 from moving outwardly toward the outer edge of the disc. In addition, the action of the oblique portion 18 into engagement with the edge 19 causes the head portion 4 and its vicinity to swing slightly in the counterclockwise direction as viewed in FIG. 4. This swinging movement aids in increasing the force depressing the edge of the tab portion 5 against the internal surface 17. In this fixed position of the balancing piece 1, a shoulder 20 of the head portion 4 which is wider than the thickness "a" of the vent 12 is opposed to the edge 19 with a slight clearance therebetween, so that it functions as a means for preventing the worst possible trouble that the balancing piece 1 is moved off its position toward the outer edge of the disc by the centrifugal force in the event the oblique portion 18 failed to completely engage the edge 19.

In the condition where the balancing piece 1 is fixedly received within the vent 12 in the manner as described above, the wide portion 2 is located in parallel to the line along the width of the vent 12 with the edges thereof being in contact with the rounded portions 13 of the vent 12 and the top edge of the tab portion 5 being forcibly in abutment with the internal surface 17 thereby restraining the wide portion 2 from shifting away from the rounded portions 13 and perfectly preventing the balancing piece 1 from moving along and/or across the width of the vent 12 or from rotating within the vent 12. Furthermore, since the distance between the rounded portions 13 formed at both ends of the tapered opening of the vent 12 is reduced toward the center of the disc, a radially inward movement of the balancing piece 1 toward the disc center requires the wide portion 2 to move across the width of the vent 12 toward the internal surface 17, that is, toward the center of the vent 12 along the thickness thereof where the distance between the rounded portions 13 is most elongated. However, the movement of the wide portion 2 across the width of the vent 12 is restricted by the tab portion 5 in abutment with the internal surface 17. Eventually, the balancing piece 1 is not inwardly movable at all toward the center of the disc. Additionally, the balancing piece 1 is hindered from moving outwardly toward the outer edge of the disc by both the engagement of the oblique portion 18 with the edge 19 at the inner open end of the vent 12 and the "edge" effect of the tab portion 5 in abutment with the internal surface 17. In the above way, the properly installed balancing piece 1 is firmly fixed in position within the vent 12, whereby neither linear nor rotary movements thereof in any directions are permitted.

Figure 8:
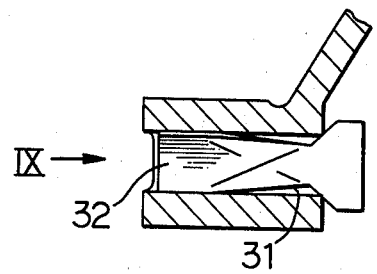
FIG. 8 is a cross sectional view showing a conventionally available balancing piece.
Figure 9:
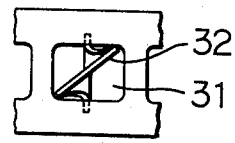
FIG. 9 is a view taken in the direction of the arrow IX in FIG. 8.

As the balancing piece 1 of this preferred embodiment is fixedly positioned with the edges of the wide portion 2 kept in contact with the rounded portions 13 of the vent 12 as detailed above, even a considerable degree of dimensional error of the vent 12 has been produced it may be accommodated in such manner that the points of contact of the edges of the wide portion 2 with the rounded portions 13 are simply shifted along the circular arcs of the rounded portions 13. This positioning method eliminates a gap otherwise developed between the wide portion 2 and the internal surfaces of the vent 12 which often causes a rattling trouble. In this respect, the balancing piece of this preferred embodiment has a dominant advantage over the aforementioned balancing piece of "Jitsukosho," No. 53-33104 presented in FIGS. 8 and 9, wherein a possible difference in size between the diagonal distance across corners of the vent 31 and the width of the wide portion 32 may easily cause the balancing piece to rattle.

While a preferred embodiment of the invention has been described and shown with a certain degree of particularity, such description is for illustrative purpose only, and it is to be understood that the invention is not limited by any of the details of description, and that various changes may be made within the spirit and scope thereof. For an example, a balancing piece in accordance with this invention may have a configuration allowing the tab portion 5 to be deformed more easily than the frame portion 6 when it is driven into the vent 12, or may be fabricated of a material which gives virtually no elastic restoring force to the frame portion 6 or to the tab portion 5 when it is deformed. It is also possible to select such combination of material and dimensions of the balancing piece as to allow the frame portion 6 or tab portion 5 to attain completely elastic deformation when the balancing piece is forced into the vent. Of course, the disclosure of the present form may be changed in configuration and dimensions of individual portions of the balancing piece. Such changes may include the provision of a plurality of tab portions.

As described in detail hereinbefore, the balancing piece as manufactured in accordance with the present invention is inserted into the vent through the open end of the vent at the outer edge of the disc and may be fixedly positioned with utmost ease by simply twisting and/or bending the leading end portion projected through the other open end of the vent on the disc center side so that it engages the edge of the internal surface of the vent at the inner open end on the disc center side. Once the balancing piece is fixedly positioned, there may be substantially no change of accidental radial movement thereof toward the outer edge as well as toward the center of the disc, and no possibility of rattling thereof within the vent whereby the rattling noise may be effectively arrested.

What is claimed is:

1. In a ventilated brake disc including therein a number of radially disposed cooling vents each having a width continuously increasing toward an outer edge of said disc and being provided with rounded portions at corners, a balancing piece fixedly received within said vents for improving rotational balance of said disc, comprising as integral parts thereof:
    (a) a wide portion both edges of which are put into contact with said rounded portions at said both ends of said vent when said balancing piece is inserted into the vent in parallel to said width of the vent through an open end of the vent at said outer edge of said disc to a predetermined depth;
    (b) at least one tab portion formed adjacent to said wide portion and protruding at an acute angle relative to a surface of a wide end portion of said balancing piece, top edge of said at least one tab portion being forcibly in abutment with an internal surface of said vent when said balancing piece is inserted in position thereby preventing said wide portion from shifting away from said rounded portions; and
    (c) a locking portion which is projected through an open end of said vent on the disc center side when said balancing piece is inserted to said predetermined depth, said projected locking portion being put into engagement with an edge of said internal surface of said vent at said open end on said disc center side thereby restraining said balancing piece from moving radially outwardly toward said outer edge of the disc.

2. The balancing piece of claim 1 wherein width of said at least one tab portion as measured along the root thereof is greater than overall width of said wide portion as measured similarly along said root minus said width of said at least one tab portion.

3. The balancing piece of claim 1 fabricated of a resilient material permitting substantially perfect elastic deformation of said tab portion and/or said wide portion when said balancing piece is forced into said vent.

4. The balancing piece of claim 1 fabricated of a material permitting plastic deformation as well as elastic deformation of said wide portion and/or said tab portion when said balancing piece is forced into said vent.

5. The balancing piece of claim 1 wherein said locking portion is a neck portion to be twisted and engaged with said edge of said disc, said neck portion being provided, at the tip thereof, with a head portion which is wider than the thickness of said vent and has a shoulder confronted with said edge of said disc, whereby said shoulder may prevent said balancing piece from radially moving off its position in the vent toward the outer edge of the disc when said locking portion has failed to correctly engage said edge of said disc.

* * * * *